(12) United States Patent
Thornton et al.

(10) Patent No.: US 9,302,765 B2
(45) Date of Patent: Apr. 5, 2016

(54) VARIABLE PITCH PROPELLER ROTOR

(75) Inventors: Stewart T. Thornton, Derby (GB); Paul Simms, Hathern (GB); Colin W R McFarlane, Milton Keynes (GB)

(73) Assignee: ROLLS-ROYCE plc, London (GB)

( * ) Notice: Subject to any disclaimer, the term of this patent is extended or adjusted under 35 U.S.C. 154(b) by 911 days.

(21) Appl. No.: 13/458,386

(22) Filed: Apr. 27, 2012

(65) Prior Publication Data

US 2012/0294718 A1 Nov. 22, 2012

(30) Foreign Application Priority Data

May 16, 2011 (GB) .................................. 1108091.8

(51) Int. Cl.
*B64C 11/32* (2006.01)
*B64C 11/30* (2006.01)
*B64D 27/00* (2006.01)

(52) U.S. Cl.
CPC ............... *B64C 11/306* (2013.01); *B64C 11/32* (2013.01); *B64D 2027/005* (2013.01); *Y02T 50/66* (2013.01)

(58) Field of Classification Search
CPC  B64C 11/306; B64C 2027/005; B64C 11/32; Y02T 50/66
See application file for complete search history.

(56) References Cited

U.S. PATENT DOCUMENTS

| 3,902,822 | A | * | 9/1975 | Andrews et al. | ........... 416/170 R |
| 3,964,839 | A | * | 6/1976 | Kusiak | ........... 416/160 |
| 4,657,484 | A | * | 4/1987 | Wakeman et al. | ........... 416/127 |
| 5,154,580 | A |   | 10/1992 | Hora |   |
| 5,242,265 | A | * | 9/1993 | Hora et al. | ........... 416/26 |

FOREIGN PATENT DOCUMENTS

EP   0 196 919 A2   10/1986
GB   2 197 912 A    6/1988

OTHER PUBLICATIONS

Sep. 8, 2011 British Search Report issued in British Application No. GB 1108091.8.

* cited by examiner

*Primary Examiner* — Nathaniel Wiehe
*Assistant Examiner* — Jeffrey A Brownson
(74) *Attorney, Agent, or Firm* — Oliff PLC

(57) ABSTRACT

A bladed rotor comprises a rotor body 2 carrying blades 6, whose pitch can be varied by means of a pitch input shaft 10. The pitch input shaft 10 drives the respective blade 6 about a spanwise axis X of the blade through a harmonic drive reduction gear 14. The harmonic drive reduction gear 14 comprises a wave generator 16 which is fixed for rotation on the pitch input shaft 10 and a flex spline which meshes with a circular spline 20 and is secured to the blade 6.

9 Claims, 1 Drawing Sheet

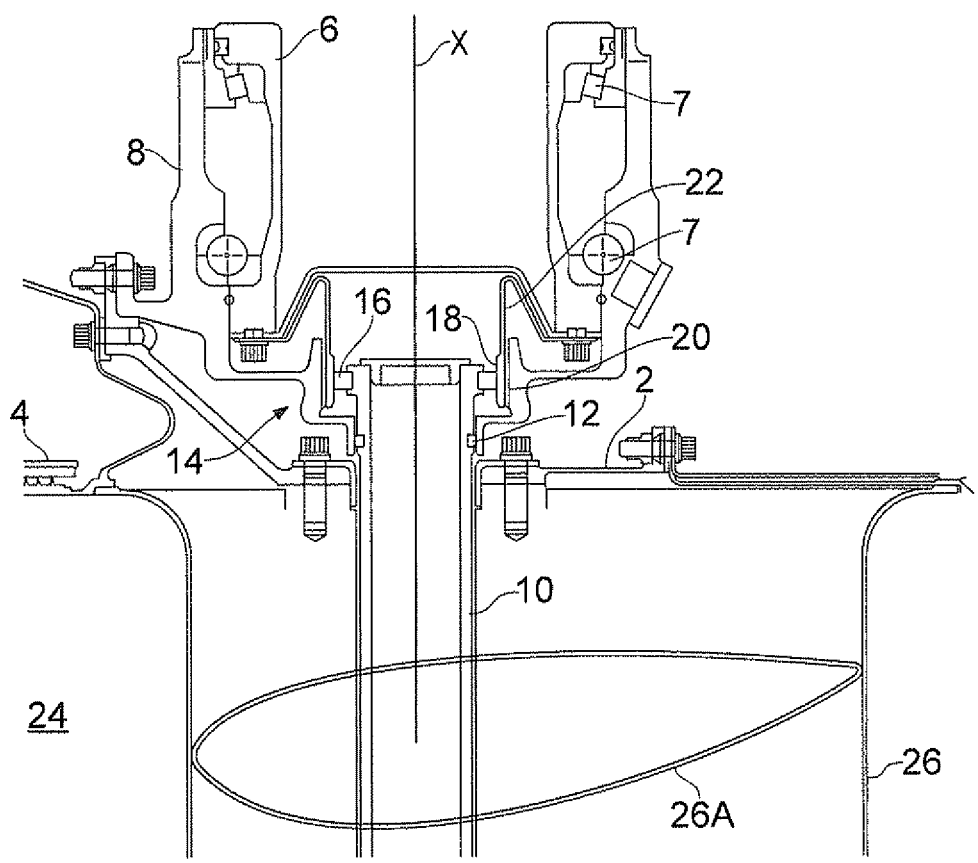

VARIABLE PITCH PROPELLER ROTOR

This invention relates to a variable pitch propeller rotor, and is particularly, although not exclusively, concerned with such a rotor which is part of, or driven by, a gas turbine engine.

A known type of gas turbine engine, particularly for use in aircraft propulsion, is a propeller gas turbine engine or turboprop. This works in conventional form, whereby a core engine comprising compressors, combustion equipment and turbines drives one or more propeller rotor stages via a shaft from a free power, or low-pressure, turbine. The propeller rotor stage or stages may be situated at the front or rear of the engine, with respect to the direction of airflow through the engine. The propeller rotor blades extend radially outwardly beyond the core engine. The blades may be surrounded by a fan casing to form a ducted fan, or they may be unducted to form what is known as an "open rotor".

Each blade is of variable pitch, and for this purpose is pivotable about its own longitudinal axis (i.e. a spanwise axis) so as to change its angle of attack relative to the airflow. This variable pitch enables more efficient operation at a variety of operating conditions since the incident angle between the airflow and the blade surface can be optimised for the given airspeed and operating mode of the engine and aircraft.

Mechanisms for controlling blade pitch on propeller rotors are often complex, since it is necessary to transmit a pitch variation input across the boundary between a stationary part of the engine and the rotating propeller rotor. It is known to adopt hydraulic systems for this purpose, particularly for traditional turbo prop engines in which the propeller unit is at the front of the engine. In such configurations, the hydraulic system is easily accessible for maintenance and repair, but this is not the case if the propeller rotor is at the rear of the engine, since it is then buried deep within the engine. Furthermore, hydraulic systems need to operate at very high pressures in order to vary the pitch of significant numbers (i.e. six or more) highly loaded blades.

Geared pitch change mechanisms are known from, for example, U.S. Pat. No. 5,154,580. A pitch control mechanism is situated at or close to the engine axis, and transmits rotation to the propeller blades by means of respective pitch input shafts which extend generally radially of the engine. Known pitch control mechanisms produce a control output at relatively high rotational speed, and it is necessary to reduce this before it is applied to the blade, in order to achieve accuracy in the positioning of each blade about its spanwise pitch axis. In U.S. Pat. No. 5,154,580 this is achieved by way of an epicyclic reduction gear at the outer end of each pitch input shaft. Such mechanisms incorporate clearances between the gear teeth, which result in backlash which introduces a deadband and non-linear torsional stiffness. This results in poor control system fidelity and the possibility of damaging vibration. Furthermore, the epicyclic gearboxes add significantly to the weight of the system, and the large number of components tends to reduce reliability.

Space within the rotor is restricted, and this means that the size, and therefore reduction ratio, of any reduction gearing incorporated in the pitch control mechanism is limited.

Furthermore, some open rotor designs with propellers at the rear require the actuating mechanism for pitch control to extend across the annular gas flow path of the engine exhaust. The low reduction ratios of existing systems mean that the pitch input shafts extending across the exhaust annulus have to transmit substantial torque, and therefore need to have a relatively large diameter. These shafts are commonly surrounded by sleeves which are profiled to serve as vanes, and the aerodynamic efficiency of such vanes is compromised by the need to accommodate the relatively large-diameter shafts.

According to the present invention there is provided a variable pitch bladed rotor comprising a rotor body carrying a plurality of blades which are pivotable relatively to the rotor body about respective spanwise pitch axes, each blade being drivably coupled to a pitch control mechanism by a respective pitch input shaft which is aligned with the pitch axis and which is drivingly connected to the blade by a harmonic drive reduction gear.

A harmonic drive reduction gear comprises a circular spline within which a flex spline travels under the action of a wave generator. The flex spline is radially flexible, and is deformed by the wave generator into a lobed configuration, which is typically two-lobed and so is of generally elliptical form. Teeth at the lobes of the flex spline mesh with teeth of the circular spline, while regions of the flex spline away from the lobes are out of mesh with the circular spline. The wave generator causes the lobes of the flex spline to move around the circular spline as a travelling wave, causing the flex spline to advance around the circular spline on each rotation, by an amount dependent on the difference in the number of teeth between the flex spline and the circular spline. The result is a substantial reduction in speed between the rotation of the driver of the wave generator and the rotation of the flex spline.

In a specific embodiment in accordance with the present invention, the flex spline of the harmonic drive reduction gear is secured to the blade, the circular spline is fixed with respect to the rotor body, and the wave generator is fixed for rotation on the pitch input shaft.

Each blade made be pivotably mounted in a respective blade hub secured to the rotor body, in which case the circular spline may be provided on the blade hub.

Another aspect of the present invention provides a gas turbine engine having a bladed rotor as defined above. The pitch input shafts may extend across an annular gas flow path of the gas turbine engine. Each pitch input shaft may be accommodated within a sleeve, having an aerodynamic profile, which extends across the gas flow path.

The bladed rotor may comprise an open propeller rotor or a ducted fan.

For a better understanding of the present invention, and to show more clearly how it may be carried in to effect, reference will now be made, by way of example, to the accompanying FIGURE which is a partial sectional view of a propeller blade root in an open rotor propulsion unit.

As shown in the FIGURE, the propulsion unit comprises a bladed rotor having a rotor body comprising an annular casing 2. The rotor body 2 is driven by a gas turbine engine so that it rotates about a fixed part of the engine represented only schematically at 4. The casing 2 carries a plurality of propeller blades, of which one is represented in the FIGURE by a blade root 6. The blade root 6 is supported by bearings 7 within a blade hub 8 secured to the casing 2.

A pitch input shaft 10 extends from a pitch control mechanism (not shown) which is situated generally at the rotational axis of the rotor (which is not shown in the FIGURE, but lies below the part of the mechanism shown in the FIGURE). As shown in the FIGURE, the pitch input shaft 10 passes through a seal 12 secured to the casing 2, into the hub 8. The pitch input shaft 10 is drivingly connected to the blade root 6 by a harmonic drive reduction gear 14.

The reduction gear 14 comprises a wave generator 16, a flex spline 18 and a circular spline 20. The wave generator 16 is mounted on, and rotatable with, the pitch input shaft 10, and has a non-circular, for example oval or elliptical, outer periphery which cooperates, through a roller bearing arrangement, with the internal surface of the flex spline 18. The flex spline 18 is made from a material, such as steel, which is sufficiently flexible to enable it to be deformed as the wave generator 16 rotates within it. The flex spline 18 is connected by a thin web 22 to the blade root 6. As a result, the flex spline is supported for rotation by the bearings 7 and does not require separate dedicated bearing support. It will be appreciated from the FIGURE that the pitch input shaft 10 and the blade root 6 are rotatable about a common axis X which extends in the spanwise direction of the blade 6.

The outer periphery of the flex spline 18 is provided with gear teeth, which mesh with corresponding gear teeth of the circular spline 20, which is formed on an inner surface of the hub 8.

The casing 2 defines an exhaust flow path 24 of the gas turbine engine driving the propulsion unit. In order to shield the pitch input shaft 10 from the exhaust flow, it is enclosed within a sleeve 26 having an aerodynamic profile, as indicated by the cross-section 26A in the FIGURE.

In operation, the propulsion unit, comprising the casing 2 and the propeller blades 6, rotates with respect to the fixed structure 4 of the gas turbine engine. The pitch input shafts 10 of the respective blades 6 are thus also rotating. A pitch control mechanism, which may be of conventional form and is situated towards the engine axis, causes the pitch input shaft 10 to rotate about the axis X when the pitch of the respective blade 6 is to be changed. Rotation of the pitch input shaft 10 causes rotation of the wave generator 16, and this generates a travelling wave in the flex spline 18. The travelling wave causes the teeth of the flex spline 18 to be moved successively into and out of meshing engagement with the teeth of the circular spline 20. The flex spline 18 has fewer teeth than the circular spline 20 (for example, it may have two fewer teeth), so the travelling wave causes the flex spline 18 to progress around the circular spline 20 at a greatly reduced speed, and in the opposite direction, compared with that of the pitch input shaft 10. When the respective blade 6 reaches the desired pitch angle, rotation of the pitch input shaft 10 stops, and the propeller blade 6 is fixed in its new position.

Since there is tooth-to-tooth contact between the flex spline 18 and the circular spline 20 over an extended region of the circular spline 20 corresponding to the lobes of the wave generator 16, the arrangement shown in the FIGURE has substantial torsional stiffness and significantly less backlash than exists in conventional spur gearing. Also, a significantly larger reduction gear ratio can be achieved using the harmonic drive 14 than with conventional gear mechanisms, which means that the input torque transmitted by the pitch control shaft 10 can be reduced and its speed can be increased. This in turn enables the diameter of the pitch input shaft 10 to be reduced, leading to a corresponding reduction in the width of the sleeve 26, reducing the obstruction to the exhaust flow 24.

Although the circular spline 20 is shown in the FIGURE as integral with the hub 8 it could comprise a separate component secured to the hub 8.

The described embodiment of the invention has a 2-bearing blade root support (bearings 7), but the invention would also work with single or multiple bearing configurations of blade root support.

It will be appreciated that the variable pitch bladed rotor arrangement has the harmonic drive reduction gear connected directly to the blade root. This allows a relatively high speed and hence small diameter shaft to cross the gas flow path. This is advantageous because it allows a much more compact and lighter arrangement. Furthermore, having the harmonic drive reduction gear connected directly to the blade root can achieve much higher ratios than conventional systems which drive a bevel gear set that then rotates the blades.

Although the present invention has been described above with reference to an open rotor propulsion unit, it can be applied to any form of bladed rotor, including, for example, a variable pitch fan or a turboprop having a forward mounted propeller.

The invention claimed is:

1. A variable pitch bladed rotor comprising a rotor body carrying a plurality of blades, each blade having a blade root supported by bearings in a blade hub of the rotor body so as to be pivotable relative to the rotor body about respective spanwise pitch axes, each blade being drivably coupled to a pitch control mechanism by a respective pitch input shaft which is aligned with the pitch axis and which is drivingly connected to the blade by a harmonic drive reduction gear, the harmonic drive reduction gear comprising a circular spline in toothed engagement with a flex spline and a wave generator arranged to generate a travelling wave in the flex spline, wherein the circular spline is fixedly mounted on the blade hub and the flex spline is secured to the blade root.

2. A variable pitch bladed rotor as claimed in claim 1, in which each blade is pivotably mounted in a respective blade hub secured to the rotor body and the circular spline is provided on an inner surface of the blade hub.

3. A variable pitch bladed rotor as claimed in claim 1, in which the wave generator is fixed for rotation with the pitch input shaft.

4. A gas turbine engine provided with a variable pitch bladed rotor in accordance with claim 1.

5. A gas turbine engine as claimed in claim 4, in which each pitch input shaft extends across an annular gas flow path of the gas turbine engine.

6. A gas turbine engine as claimed in claim 5, in which each pitch input shaft is accommodated within a respective sleeve extending across the gas flow path.

7. A gas turbine engine as claimed in claim 6, in which each sleeve has an aerodynamic profile.

8. A gas turbine engine as claimed in claim 4, in which the gas turbine engine is an open rotor gas turbine engine.

9. A gas turbine engine as claimed in claim 4, in which the gas turbine engine is a ducted fan engine or a turboprop engine.

* * * * *